United States Patent
Mitsunaga

(10) Patent No.: US 7,884,759 B2
(45) Date of Patent: Feb. 8, 2011

(54) POSITIONING METHOD

(75) Inventor: Shinichi Mitsunaga, Kanagawa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/762,624

(22) Filed: Apr. 19, 2010

(65) Prior Publication Data

US 2010/0214167 A1 Aug. 26, 2010

Related U.S. Application Data

(63) Continuation of application No. 12/104,584, filed on Apr. 17, 2008, now Pat. No. 7,728,768.

(30) Foreign Application Priority Data

Apr. 23, 2007 (JP) .............................. 2007-112609
Feb. 19, 2008 (JP) .............................. 2008-037117

(51) Int. Cl.
*G01S 19/42* (2010.01)
*G01S 19/53* (2010.01)

(52) U.S. Cl. .............................. 342/357.25; 342/357.36

(58) Field of Classification Search ............ 342/357.25, 342/357.36
See application file for complete search history.

(56) References Cited

U.S. PATENT DOCUMENTS 6,535,163 B1 * 3/2003 Sahai et al. ............ 342/357.63
7,142,152 B2 * 11/2006 Burgett et al. ............... 342/120
2005/0261833 A1 * 11/2005 Brosius et al. ............... 701/213
2006/0227044 A1 10/2006 Terashima et al.

FOREIGN PATENT DOCUMENTS

JP 2006-177783 A 7/2006

* cited by examiner

*Primary Examiner*—Thomas H Tarcza
*Assistant Examiner*—Harry Liu
(74) *Attorney, Agent, or Firm*—Global IP Counselors, LLP

(57) ABSTRACT

A reception environment is determined to be a multipath environment when the difference (positioning altitude difference) between the maximum value (maximum altitude) and the minimum value (minimum altitude) of the altitudes of candidate present positions P of respective satellite sets exceeds a given threshold value (e.g., 200 m), and is determined to be an open-sky environment when the positioning altitude difference is equal to or less than the given threshold value. When the reception environment is the open-sky environment, an evaluation point E of each satellite set is calculated using a known evaluation method based on the number of satellites, a PDOP value, and the like. When the reception environment is the multipath environment, the evaluation point E of each satellite set is calculated in the same manner as in the open-sky environment, and a change amount ΔE corresponding to the difference (altitude difference) between the altitude corresponding to the preceding located position acquired from an altitude table and the altitude of the candidate present position of the target satellite set is subtracted from the evaluation point E.

5 Claims, 7 Drawing Sheets

FIG. 3A

MULTIPATH ENVIRONMENT

| COMBINATION OF SATELLITES | HORIZONTAL ERROR | ALTITUDE ERROR |
|---|---|---|
| #1, #2, #3, #4, #5 | 23.76336 | 33.46875 |
| #1, #2, #3, #4, #6 | 410.5472 | 327.7344 |
| #1, #2, #3, #5, #6 | 292.2998 | 472.3281 |
| #1, #3, #4, #5, #6 | 315.7412 | 74.21875 |
| #2, #3, #4, #5, #6 | 282.251 | 247.7344 |
| #1, #2, #3, #4, #7 | 123.8018 | 110.9688 |
| #1, #2, #4, #5, #7 | 18.98121 | -8.625 |
| #1, #3, #4, #5, #7 | 39.85796 | 33.64063 |
| #2, #3, #4, #5, #7 | 41.6589 | 47.625 |
| #1, #2, #4, #6, #7 | 386.8149 | 425.625 |
| #1, #2, #3, #4, #6, #7 | 406.9407 | 368.1094 |
| #1, #3, #4, #6, #7 | 450.8061 | 409.7031 |
| #2, #3, #4, #6, #7 | 408.849 | 379.7656 |
| #1, #4, #5, #6, #7 | 284.3858 | 497.7969 |
| #2, #4, #5, #6, #7 | 337.176 | 787.7813 |
| #1, #4, #5, #6, #7 | 272.7982 | 322.7969 |
| POSITIONING ALTITUDE DIFFERENCE | | 796.4063 |

FIG. 3B

OPEN-SKY ENVIRONMENT

| COMBINATION OF SATELLITES | HORIZONTAL ERROR | ALTITUDE ERROR |
|---|---|---|
| #3, #4, #8, #9 | 1.570682 | 3.21875 |
| #3, #4, #8, #10, #11 | 7.923246 | 3.75 |
| #3, #4, #8, #9, #10, #11 | 5.750701 | 2.609375 |
| #3, #4, #8, #10 | 8.016341 | 3.484375 |
| #3, #4, #8, #9, #10 | 5.89452 | 2.265625 |
| #3, #8, #9, #10 | 6.327932 | 2.640625 |
| #3, #4, #9, #10 | 5.060281 | 1.703125 |
| #4, #8, #9, #10 | 6.945747 | 1.609375 |
| #3, #4, #8, #11 | 6.464767 | 3.75 |
| #3, #4, #8, #9, #11 | 1.226936 | 3.625 |
| #3, #8, #9, #11 | 1.173332 | 3.484375 |
| #3, #4, #9, #11 | 1.300259 | 2.8125 |
| #4, #8, #9, #11 | 1.272071 | 3.609375 |
| #3, #8, #10, #11 | 7.865834 | 3.25 |
| #3, #4, #10, #11 | 6.598414 | 2.981375 |
| #4, #8, #10, #11 | 8.22368 | 3.515625 |
| #3, #9, #10, #11 | 6.566256 | 2.3125 |
| #3, #8, #9, #10, #11 | 6.330112 | 3.015625 |
| #8, #9, #10, #11 | 10.81392 | 3.59375 |
| #4, #9, #10, #11 | 5.092336 | 1.609375 |
| #3, #4, #9, #10, #11 | 4.807373 | 1.65625 |
| #4, #8, #11 | 27.80144 | 2.921875 |
| POSITIONING ALTITUDE DIFFERENCE | | 2.140625 |

ALTITUDE TABLE

| AREA ID | CENTER POSITION | ALTITUDE |
|---------|-----------------|----------|
| 001 | (Xo1, Yo1) | Zo1 |
| 002 | (Xo2, Yo2) | Zo2 |
| 003 | (Xo3, Yo3) | Zo3 |
| ⋮ | ⋮ | ⋮ |

RECEPTION ENVIRONMENT DETERMINATION CONDITION TABLE

| RECEPTION ENVIRONMENT | DETERMINATION CONDITION |
|------------------------|-------------------------|
| OPEN-SKY ENVIRONMENT | POSITIONING ALTITUDE DIFFERENCE ≦200[m] |
| MULTIPATH ENVIRONMENT | POSITIONING ALTITUDE DIFFERENCE >200[m] |

CALCULATION EQUATION SELECTION CONDITION TABLE

| CHANGE AMOUNT CALCULATION EQUATION (324a) | SELECTION CONDITION (324b) |
|---|---|
| f1 | POSITIONING ALTITUDE DIFFERENCE ≦1000[m] |
| f2 | POSITIONING ALTITUDE DIFFERENCE >1000[m] |

324

- 33 — RAM
- 331 — SATELLITE POSITION DATA
- 332 — SATELLITE SET DATA
- 333 — POSITIONING RESULT DATA

SATELLITE POSITION DATA

| GPS SATELLITE (331a) | SATELLITE POSITION (331b) |
|---|---|
| #1 | (X1, Y1, Z1) |
| #2 | (X2, Y2, Z2) |
| #3 | (X3, Y3, Z3) |
| ⋮ | ⋮ |

SATELLITE SET DATA

| SATELLITE SET | GPS SATELLITE | PRESENT POSITION CANDIDATE | NUMBER OF SATELLITES | PDOP VALUE | EVALUATION POINT |
|---|---|---|---|---|---|
| A | #1, #2, #3, #4, #5 | (xa, ya, za) | 5 | 1.9 | 1.5 |
| B | #2, #3, #5, #6 | (xb, yb, zb) | 4 | 2.5 | 12.1 |
| C | #1, #4, #5, #6, #8 | (xc, yc, zc) | 5 | 4.3 | 6.7 |
| ⋮ | ⋮ | ⋮ | ⋮ | ⋮ | ⋮ |

FIG. 11

POSITIONING RESULT DATA

| POSITIONING TIME | SELECTED SATELLITE SET | LOCATED POSITION |
|---|---|---|
| t01 | C | (x1, y1, z1) |
| t02 | A | (x2, y2, z2) |
| t03 | C | (x3, y3, z3) |
| ⋮ | ⋮ | ⋮ |

POSITIONING METHOD

This is a continuation application of U.S. patent application Ser. No. 12/104,584 which claims priority to Japanese Patent Application No. 2007-112609 filed on Apr. 23, 2007 and Japanese Patent Application No. 2008-37117 filed on Feb. 19, 2008. The entire disclosure of U.S. patent application Ser. No. 12/104,584 and Japanese Patent Application Nos. 2007-112609 and 2008-37117 is hereby incorporated herein by reference.

BACKGROUND OF THE INVENTION

The present invention relates to a positioning method, a storage medium, a positioning device, and an electronic instrument.

The global positioning system (GPS) is widely known as a satellite positioning system, and is utilized for a car navigation system and the like. In the GPS, GPS satellite signals are respectively transmitted from a plurality of GPS satellites which orbit the earth, and a GPS receiver calculates (locates) its present position based on the received GPS satellite signals.

A GPS satellite signal affected by a multipath or the like may be included in the acquired GPS satellite signals. The term "multipath" refers to a phenomenon in which an indirect wave reflected or diffracted by a building or topography is superimposed on a direct wave from a GPS satellite so that the GPS receiver receives identical radio waves through multiple paths. Such a reception environment is referred to as a multipath environment. The present position of the GPS receiver may not be accurately calculated (located) when using a GPS satellite signal affected by a multipath. To deal with this problem, a method has been known which improves positioning accuracy utilizing an altitude table (urban altitude information) in a multipath area in which a number of buildings such as high buildings are present (e.g., the center of Tokyo). The altitude table is a data table in which a central urban area having a small difference in altitude is divided into a predetermined number of (i.e., nine) mesh areas and the altitude corresponding to each mesh area is specified (see JP-A-2006-177783, for example).

The GPS receiver generally calculates its position as follows. Specifically, the GPS receiver selects satellite sets (i.e., combinations of four or more GPS satellites) based on the acquired GPS satellite signals, and performs positioning calculations corresponding to the respective satellite sets to calculate candidate present positions. The GPS receiver evaluates the positioning accuracy of the candidate present positions calculated corresponding to the respective satellite sets based on an index such as a position dilution of precision (PDOP), and determines the candidate present position having the highest evaluation result to be the present positioning result.

However, the positioning accuracy of each satellite set does not differ to a large extent in a reception environment with high overall positioning accuracy (e.g., open-sky environment). On the other hand, GPS satellite signals are affected by a multipath to a different extent in a reception environment with poor positioning accuracy (e.g., multipath environment). As a result, the positioning accuracy of each satellite set may differ to a large extent. In this case, it is important to appropriately determine a satellite set with high positioning accuracy. According to related-art technology, the candidate present position of each satellite set is evaluated using an evaluation method similar to that used for a reception environment with high positioning accuracy (e.g., open-sky environment).

SUMMARY

According to one aspect of the invention, there is provided a positioning method comprising:

selecting satellite sets, each of the satellite sets being a combination of satellites used for present positioning calculations;

calculating candidate present positions including a present position altitude corresponding to the respective satellite sets using satellite signals from the satellites included in the respective satellite sets;

determining a reception environment based on a dispersion of the present position altitudes of the respective satellite sets;

evaluating the candidate present positions corresponding to the respective satellite sets using an evaluation method corresponding to the reception environment; and selecting a candidate present position from the candidate present positions corresponding to the respective satellite sets based on the evaluation results, and determining the selected candidate present position to be a present located position.

According to another aspect of the invention, there is provided a positioning method comprising:

selecting satellite sets, each of the satellite sets being a combination of satellites used for present positioning calculations;

calculating candidate present positions including a present position altitude corresponding to the respective satellite sets using satellite signals from the satellites included in the respective satellite sets;

evaluating the candidate present positions corresponding to the respective satellite sets using a given evaluation method that adjusts an evaluation result based on a difference between the present position altitude of a target satellite set among the satellite sets and a given reference altitude; and selecting a candidate present position from the candidate present positions corresponding to the respective satellite sets based on the evaluation results, and determining the selected candidate present position to be a present located position.

BRIEF DESCRIPTION OF THE SEVERAL VIEWS OF THE DRAWING

FIGS. 3A and 3B show experimental results indicating the relationship between a reception environment and a positioning error.

FIG. 10 shows a data configuration example of satellite set data.

FIG. 11 shows a data configuration example of positioning result data.

DETAILED DESCRIPTION OF THE EMBODIMENT

Figure 1:
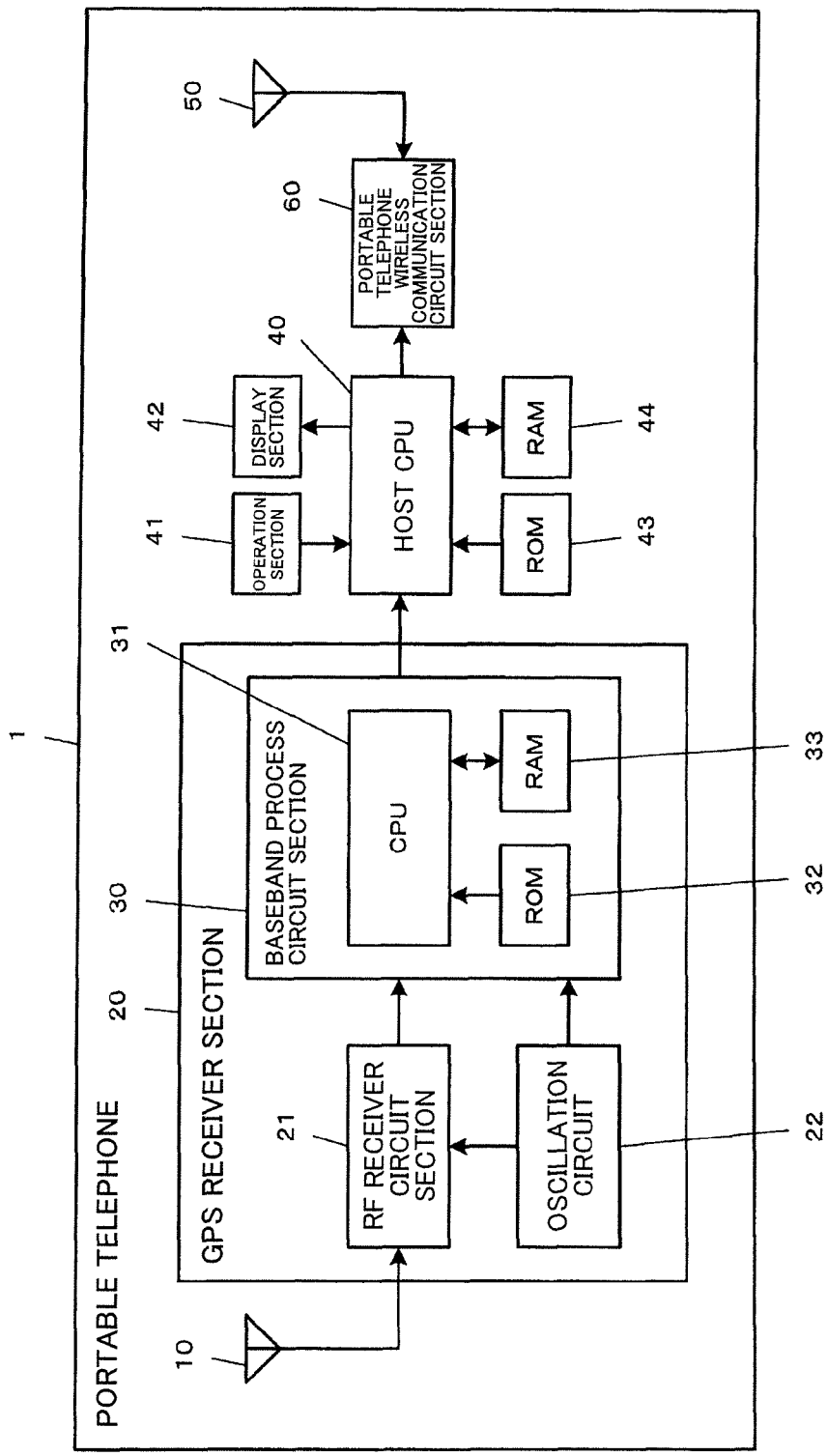
FIG. 1 is an internal configuration diagram of a portable telephone.

Several embodiments of the invention may enable the candidate present position of each satellite set to be appropriately evaluated corresponding to the reception environment.

According to one embodiment of the invention, there is provided a positioning method when receiving satellite signals transmitted from positioning satellites and repeating present position positioning calculations based on the received satellite signals, the positioning method comprising:

selecting satellite sets based on the received satellite signals, each of the satellite sets being a combination of satellites used for present positioning calculations;

calculating candidate present positions including a present position altitude corresponding to the respective satellite sets using the satellite signals from the satellites included in the respective satellite sets;

determining a reception environment based on a dispersion of the present position altitudes of the respective satellite sets;

evaluating the candidate present positions corresponding to the respective satellite sets using an evaluation method corresponding to the reception environment; and selecting a candidate present position from the candidate present positions corresponding to the respective satellite sets based on the evaluation results, and determining the selected candidate present position to be a present located position.

According to another embodiment of the invention, there is provided a positioning device that receives satellite signals transmitted from positioning satellites and performs present position positioning calculations based on the received satellite signals, the positioning device comprising:

a satellite set selection section that selects satellite sets based on the received satellite signals, each of the satellite sets being a combination of satellites used for present positioning calculations;

an individual satellite set present position calculation section that calculates candidate present positions including a present position altitude corresponding to the respective satellite sets using the satellite signals from the satellites included in the respective satellite sets;

an environment determination section that determines a reception environment based on a dispersion of the present position altitudes of the respective satellite sets;

an evaluation section that evaluates the candidate present positions corresponding to the respective satellite sets using an evaluation method corresponding to the reception environment; and a present position determination section that selects a candidate present position from the candidate present positions corresponding to the respective satellite sets based on the evaluation results, and determines the selected candidate present position to be a present located position.

According to the above configuration, the candidate present position including the present position altitude is calculated corresponding to each satellite set selected based on the received satellite signals, and the reception environment is determined based on the dispersion of the calculated present position altitude of each satellite set. The candidate present position corresponding to each satellite set is evaluated using the evaluation method corresponding to the determined reception environment, and the candidate present position selected based on the evaluation results is determined to be the present located position.

The term "dispersion" refers to an index that indicates the degree (variation) of distribution, and is indicated by the difference between the maximum value and the minimum value, a standard deviation, a variance, or the like. Specifically, when the variation in the present position altitude corresponding to each satellite set is large, the reception environment is likely to be a reception environment (e.g., multipath environment) with a large positioning error. On the other hand, when the variation in the present position altitude corresponding to each satellite set is small, the reception environment is likely to be a reception environment (e.g., open-sky environment) with a small positioning error. Therefore, the reception environment can be determined based on the dispersion of the calculated present position altitude corresponding to each satellite set, and the candidate present position corresponding to each satellite set can be appropriately evaluated using the evaluation method corresponding to the reception environment. As a result, the candidate present position determined to be the located position can be appropriately selected from the candidate present positions corresponding to the respective satellite sets.

In the positioning method, the determining of the reception environment may include determining the dispersion based on a difference between a maximum altitude and a minimum altitude of the present position altitudes of the respective satellite sets.

In the positioning device, the environment determination section may determine the reception environment while determining the dispersion based on a difference between a maximum altitude and a minimum altitude of the present position altitudes of the respective satellite sets.

According to the above configuration, the reception environment is determined by determining the dispersion based on a difference between the maximum altitude and the minimum altitude of the calculated present position altitudes of the respective satellite sets. For example, the positioning error of each satellite set is large in a reception environment (e.g., multipath environment) with low positioning accuracy. Therefore, the variation in the calculated present position altitude is large. On the other hand, the positioning error of each satellite set is small in a reception environment (e.g., open-sky environment) with high positioning accuracy. Therefore, the variation in the calculated present position altitude is small. Therefore, the reception environment (e.g., positioning accuracy is high or low) can be determined based on the difference between the maximum altitude and the minimum altitude of the calculated present position altitudes.

In the positioning method, the determining of the reception environment may include determining a reception environment from a plurality of reception environments including a multipath environment; and the evaluating of the candidate present positions may include adjusting the evaluation results of the candidate present positions corresponding to the respective satellite sets based on a difference between the present position altitude of a target satellite set among the satellite sets and a given reference altitude, and increasing an adjustment amount when the reception environment has been determined to be the multipath environment as compared with a case where the reception environment has been determined to be a reception environment other than the multipath environment.

In the positioning device, the environment determination section may determine a reception environment from a plurality of reception environments including a multipath environment; and the evaluation section may adjust the evaluation results of the candidate present positions corresponding to the respective satellite sets based on a difference between the present position altitude of a target satellite set among the satellite sets and a given reference altitude, and may increase an adjustment amount when the environment determination section has determined that the reception environment is the multipath environment as compared with a case where the environment determination section has determined that the reception environment is a reception environment other than the multipath environment.

According to the above configuration, the reception environment is determined from a plurality of reception environments including the multipath environment. The evaluation results of the candidate present positions corresponding to the respective satellite sets are adjusted based on the difference between the present position altitude and the given reference altitude, and the adjustment amount is increased when the reception environment has been determined to be the multipath environment as compared with the case where the reception environment has been determined to be a reception environment other than the multipath environment. Therefore, the candidate present positions can be appropriately evaluated corresponding to the reception environment by decreasing the evaluation results in the multipath environment to a large extent when the positioning accuracy of the multipath environment is lower than that of other reception environments, for example.

According to another embodiment of the invention, there is provided a positioning method when receiving satellite signals transmitted from positioning satellites and repeating present position positioning calculations based on the received satellite signals, the positioning method comprising:

selecting satellite sets based on the satellite signals, each of the satellite sets being a combination of satellites used for present positioning calculations;

calculating candidate present positions including a present position altitude corresponding to the respective satellite sets using the satellite signals from the satellites included in the respective satellite sets;

evaluating the candidate present positions corresponding to the respective satellite sets using a given evaluation method that adjusts an evaluation result based on a difference between the present position altitude of a target satellite set among the satellite sets and a given reference altitude; and selecting a candidate present position from the candidate present positions corresponding to the respective satellite sets based on the evaluation results, and determining the selected candidate present position to be a present located position.

According to another embodiment of the invention, there is provided a positioning device that receives satellite signals transmitted from positioning satellites and repeats present position positioning calculations based on the received satellite signals, the positioning device comprising:

a satellite set selection section that selects satellite sets based on the satellite signals, each of the satellite sets being a combination of satellites used for present positioning calculations;

an individual satellite set present position calculation section that calculates candidate present positions including a present position altitude corresponding to the respective satellite sets using the satellite signals from the satellites included in the respective satellite sets;

an evaluation section that evaluates the candidate present positions corresponding to the respective satellite sets using a given evaluation method that adjusts an evaluation result based on a difference between the present position altitude of a target satellite set among the satellite sets and a given reference altitude; and a present position determination section that selects a candidate present position from the candidate present positions corresponding to the respective satellite sets based on the evaluation results, and determines the selected candidate present position to be a present located position.

According to the above configuration, the candidate present position including the present position altitude is calculated corresponding to each satellite set selected based on the received satellite signals, and the candidate present position selected based on the evaluation results of the calculated candidate present positions corresponding to the satellite sets is determined to be the present located position. The candidate present position corresponding to each satellite set is evaluated using the given evaluation method that adjusts the evaluation result corresponding to the difference between the present position altitude of the satellite set and the given reference altitude. Therefore, the candidate present positions can be appropriately evaluated corresponding to the reception environment by decreasing the evaluation results to a large extent in a reception environment (e.g., multipath environment) with positioning accuracy lower than that of other reception environments, for example.

In the positioning method,
the evaluating of the candidate present positions may include evaluating the candidate present positions using an altitude of a located position determined by preceding positioning calculations as the given reference altitude.

In the positioning device,
the evaluation section may evaluate the candidate present positions using an altitude of a located position determined by preceding positioning calculations as the given reference altitude.

According to the above configuration, the candidate present position corresponding to each satellite set is evaluated using the altitude of the located position determined by the preceding positioning calculations as the reference altitude. For example, when repeatedly locating the present position at given time intervals (e.g., intervals of one second), the positioning accuracy of the target satellite set can be determined based on the difference between the present position altitude of each satellite set and the altitude of the preceding located position. Specifically, the larger the difference in altitude, the lower the positioning accuracy is.

In the positioning method,
the evaluating of the candidate present positions may include acquiring an altitude corresponding to the located position determined by the preceding positioning calculations from given altimeter data that defines altitudes of each area, and evaluating the candidate present positions using the acquired altitude as the given reference altitude.

In the positioning device,
the evaluation section may acquire an altitude corresponding to the located position determined by the preceding positioning calculations from given altimeter data that defines altitudes of each area, and may evaluate the candidate present positions using the acquired altitude as the given reference altitude.

According to the above configuration, the candidate present position corresponding to each satellite set is evaluated using the altitude corresponding to the located position determined by the preceding positioning calculations and acquired from the given altimeter data that defines the altitude of each area as the reference altitude. For example, when repeatedly locating the present position at given time intervals (e.g., intervals of one second), the positioning accuracy of the target satellite set can be determined based on the difference between the present position altitude of each satellite set and the altitude corresponding to the preceding located position. Specifically, the larger the difference in altitude, the lower the positioning accuracy is. Since the located position determined by positioning calculations is not necessarily an accurate value, the positioning accuracy can be more accurately determined using the altitude acquired from the altitude data.

According to another embodiment of the invention, there is provided a positioning method comprising:

selecting satellite sets, each of the satellite sets being a combination of satellites used for present positioning calculations;

calculating candidate present positions including a present position altitude corresponding to the respective satellite sets using satellite signals from the satellites included in the respective satellite sets;

determining a reception environment based on a dispersion of the present position altitudes of the respective satellite sets;

evaluating the candidate present positions corresponding to the respective satellite sets using an evaluation method corresponding to the reception environment; and selecting a candidate present position from the candidate present positions corresponding to the respective satellite sets based on the evaluation results, and determining the selected candidate present position to be a present located position.

According to another embodiment of the invention, there is provided a positioning method comprising:

selecting satellite sets, each of the satellite sets being a combination of satellites used for present positioning calculations;

calculating candidate present positions including a present position altitude corresponding to the respective satellite sets using satellite signals from the satellites included in the respective satellite sets;

evaluating the candidate present positions corresponding to the respective satellite sets using a given evaluation method that adjusts an evaluation result based on a difference between the present position altitude of a target satellite set among the satellite sets and a given reference altitude; and selecting a candidate present position from the candidate present positions corresponding to the respective satellite sets based on the evaluation results, and determining the selected candidate present position to be a present located position.

According to another embodiment of the invention, there is provided a positioning device comprising:

a satellite set selection section that selects satellite sets, each of the satellite sets being a combination of satellites used for present positioning calculations;

an individual satellite set present position calculation section that calculates candidate present positions including a present position altitude corresponding to the respective satellite sets using satellite signals from the satellites included in the respective satellite sets;

an environment determination section that determines a reception environment based on a dispersion of the present position altitudes of the respective satellite sets;

an evaluation section that evaluates the candidate present positions corresponding to the respective satellite sets using an evaluation method corresponding to the reception environment; and a present position determination section that selects a candidate present position from the candidate present positions corresponding to the respective satellite sets based on the evaluation results, and determines the selected candidate present position to be a present located position.

According to another embodiment of the invention, there is provided a positioning device comprising:

a satellite set selection section that selects satellite sets, each of the satellite sets being a combination of satellites used for present positioning calculations;

an individual satellite set present position calculation section that calculates candidate present positions including a present position altitude corresponding to the respective satellite sets using satellite signals from the satellites included in the respective satellite sets;

an evaluation section that evaluates the candidate present positions corresponding to the respective satellite sets using a given evaluation method that adjusts an evaluation result based on a difference between the present position altitude of a target satellite set among the satellite sets and a given reference altitude; and a present position determination section that selects a candidate present position from the candidate present positions corresponding to the respective satellite sets based on the evaluation results, and determines the selected candidate present position to be a present located position.

Another embodiment of the invention relates to a computer-readable storage medium storing a program that causes a computer to execute the above positioning method, the computer being included in a positioning device that receives satellite signals transmitted from positioning satellites and locates a present position of the positioning device based on the received satellite signals.

The term "storage medium" used herein refers to a storage medium (e.g., hard disk, CD-ROM, DVD, memory card, or IC memory) from which information stored therein can be read by a computer.

A further embodiment of the invention relates to an electronic instrument comprising the above positioning device.

Preferred embodiments of the invention are described in detail below with reference to the drawings.

The following embodiments illustrate specific preferred examples of the invention and are provided with various technologically preferred limitations. Note that the scope of the invention is not limited to the following embodiments unless there is a description limiting the invention.

An embodiment in which the invention is applied to a portable telephone having a GPS positioning function is described below with reference to the drawings.

Configuration

FIG. 1 is a block diagram showing the internal configuration of a portable telephone 1 according to this embodiment. As shown in FIG. 1, the portable telephone 1 includes a GPS antenna 10, a GPS receiver section 20 (positioning device), a host central processing unit (CPU) 40, an operation section 41, a display section 42, a read-only memory (ROM) 43, a random access memory (RAM) 44, a portable telephone antenna 50, and a portable telephone wireless communication circuit section 60.

The GPS antenna 10 is an antenna which receives an RF signal including a GPS satellite signal transmitted from a GPS satellite, and outputs the received RF signal.

The GPS receiver section 20 acquires/extracts the GPS satellite signal from the RF signal received by the GPS antenna 10, and calculates the present position of the portable telephone 1 by performing positioning calculations based on a navigation message and the like extracted from the GPS satellite signal. The GPS receiver section 20 includes a radio frequency (RF) receiver circuit section 21, an oscillation circuit 22, and a baseband process circuit section 30. The RF receiver circuit section 21 and the baseband process circuit section 30 may be produced as different large scale integrated (LSI) circuits, or may be produced in one chip.

The oscillation circuit 22 is a crystal oscillator or the like which generates and outputs an oscillation signal having a given oscillation frequency.

The RF receiver circuit section 21 multiplies the RF signal input from the GPS antenna 10 by a signal obtained by dividing or multiplying the frequency of the oscillation signal input from the oscillation circuit 22 to down-convert the RF signal into an intermediate-frequency signal (hereinafter referred to as "IF signal"). The RF receiver circuit section 21 amplifies the IF signal, converts the amplified signal into a digital signal using an A/D converter, and outputs the digital signal, for example.

The baseband process circuit section 30 is a circuit section which acquires/tracks the GPS satellite signal from the IF signal input from the RF receiver circuit section 21, and performs pseudo-range calculations, positioning calculations, and the like based on a navigation message, time information, and the like extracted by decoding data.

Specifically, the baseband process circuit section 30 acquires the GPS satellite signal based on the input IF signal. The baseband process circuit section 30 acquires the GPS satellite signal by extracting the GPS satellite signal from the IF signal by performing a correlation process on the IF signal. Specifically, the baseband process circuit section 30 performs a coherent process which calculates the correlation between the IF signal and a pseudo-generated C/A code replica (code replica) using FFT calculations, and an incoherent process which integrates the correlation values (i.e., the results of the coherent process) to calculate an integrated correlation value. As a result, the phases of the C/A code and a carrier frequency contained in the GPS satellite signal are obtained.

After acquiring the GPS satellite signal, the baseband process circuit section 30 tracks the acquired GPS satellite signal. The baseband process circuit section 30 tracks the GPS satellite signals by synchronously holding a plurality of acquired GPS satellite signals in parallel. For example, the baseband process circuit section 30 performs a code loop which is implemented by a delay locked loop (DLL) and tracks the phase of the C/A code, and a carrier loop which is implemented by a phase locked loop (PLL) and tracks the phase of the carrier frequency. The baseband process circuit section 30 extracts the navigation message by decoding data contained in each GPS satellite signal which has been tracked, and performs pseudo-range calculations, positioning calculations, and the like to locate the present position.

The baseband process circuit section 30 includes a CPU 31, a ROM 32, and a RAM 33. The baseband process circuit section 30 also includes various circuits such as a C/A code replica generation circuit, a correlation calculation circuit, and a data decoder circuit.

The CPU 31 controls each section of the baseband process circuit section 30 and the RF receiver circuit section 21, and performs various calculations including a baseband process described later.

In the baseband process, the CPU 31 decodes the navigation message included in the acquired and tracked GPS satellite signal, and calculates the present position of the portable telephone 1 based on orbit information and time information of the GPS satellite included in the decoded navigation message. Specifically, the CPU 31 calculates the position of each GPS satellite and the pseudo-range between the GPS receiver and each GPS satellite when the GPS satellite has transmitted the GPS satellite signal based on the difference between the time at which each GPS satellite has transmitted the GPS satellite signal and the time at which the GPS receiver has received the GPS satellite signal. The CPU 31 calculates the present position by solving simultaneous equations in which the present position and a time error between the GPS satellite and the GPS receiver are unknown quantities. The CPU 31 can calculate the present position by receiving GPS satellite signals from at least four GPS satellites. This is because the coordinate values (x,y,z) of the present position (i.e., three-dimensional position) and a time error T between the GPS satellite and the GPS receiver are used as unknown quantities.

Specifically, the CPU 31 selects satellite sets (e.g., combinations of four or more GPS satellites) based on the acquired GPS satellite signals. For example, when eight GPS satellite signals have been acquired, the CPU 31 selects 163 $(=_8C_8+_8C_7+_8C_6+_8C_5+_8C_4)$ satellite sets. The CPU 31 then performs positioning calculations corresponding to each selected satellite set using a least-square method or the like to calculate candidate present positions P of the portable telephone 1. The term "candidate present position P" refers to a three-dimensional position represented by latitude, longitude, and altitude, for example. Note that about several tens of satellite sets may be extracted from the satellite sets generated based on the acquired GPS satellite signals, and the extracted satellite sets may be determined to be the target satellite sets.

The CPU 31 determines the reception environment based on the calculated candidate present position of each satellite set. In this example, the CPU 31 determines that the reception environment to be an open-sky environment or a multipath environment. Specifically, the CPU 31 extracts the maximum value (maximum altitude) and the minimum value (minimum altitude) of the altitudes of the candidate present positions corresponding to the respective satellite sets, and calculates a positioning altitude difference which is the difference between the maximum value and the minimum value thus extracted. The CPU 31 determines the reception environment to be the open-sky environment when the positioning altitude difference is equal to or less than a given value (e.g., 200 m), and determines the reception environment to be the multipath environment when the positioning altitude difference exceeds the given value.

After the CPU 31 has determined the reception environment, the CPU 31 calculates an evaluation point E (indicating positioning accuracy) of each satellite set using an evaluation method corresponding to the determined reception environment. The higher the evaluation point E, the higher the positioning accuracy is.

Specifically, when the reception environment is the open-sky environment, the CPU 31 calculates the evaluation point E of each satellite set using a known method based on the number of GPS satellites (number of satellites) included in the corresponding satellite set, a position dilution of precision (PDOP) based on the constellation of GPS satellites, or the signal strength of each GPS satellite signal, for example.

When the reception environment is the multipath environment, the CPU 31 calculates the evaluation point E of each satellite set in the same manner as in the open-sky environment, and then subtracts a given change amount $\Delta E$ from the calculated evaluation point E. The change amount $\Delta E$ is determined as follows. Specifically, the CPU 31 acquires the altitude (preceding altitude) corresponding to the preceding located position as a reference altitude referring to an altitude table.

The term "altitude table" refers to a data table which defines an altitude corresponding to each area (divided area) into which the earth's surface is divided in the shape of a mesh. Each divided area has a square shape and is defined so that each side of the square extends along the latitude direction or the longitude direction. The altitude may be an arbitrary altitude (e.g., ellipsoidal height or altitude above sea level).

When the CPU 31 has acquired the altitude (preceding altitude) corresponding to the preceding located position, the CPU 31 calculates an altitude difference $\Delta Z$ (i.e., difference between the altitude of the candidate present position and the acquired preceding altitude) corresponding to each satellite set. The CPU 31 then calculates the change amount $\Delta E$ based on the calculated altitude difference $\Delta Z$ using a change amount calculation equation f. The CPU 31 then subtracts the calculated change amount $\Delta E$ from the evaluation point E of the target satellite set.

Figure 2:
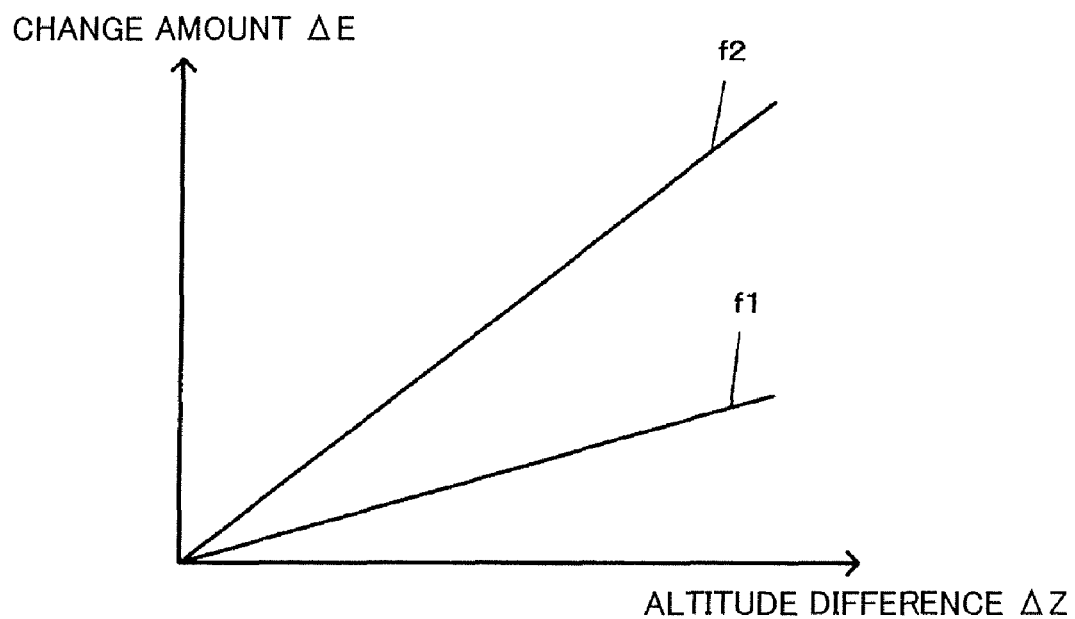
FIG. 2 is a graph of a change amount calculation equation f.

FIG. 2 is a view showing an example of the change amount calculation equation f. FIG. 2 shows a graph of the change amount calculation equation f in which the horizontal axis indicates the altitude difference $\Delta Z$ and the vertical axis indicates the change amount $\Delta E$. Note that the change amount $\Delta E$ is equal to or larger than zero ($\Delta E \geqq 0$). As shown in FIG. 2, two calculation equations f1 and f2 are defined as the change amount calculation equation f. The change amount calculation equation f1 or f2 is selected depending on the calculated positioning altitude difference. Specifically, the change amount calculation equation f1 is selected when the positioning altitude difference is equal to or smaller than a given value (e.g., 1000 m), and the change amount calculation equation f2 is selected when the positioning altitude difference is larger than the given value. The change amount calculation equations f1 and f2 are defined so that the change amount $\Delta E$ increases as the altitude difference $\Delta Z$ increases. The slope of the change amount calculation equation f1 is greater than that of the change amount calculation equation f2. Specifically, even if the altitude difference $\Delta Z$ is identical, the change amount $\Delta E$ when the positioning altitude difference is larger than 1000 m is greater than the change amount $\Delta E$ when the positioning altitude difference is equal to or less than 1000 m.

FIGS. 3A and 3B show examples of experimental results indicating the relationship between the reception environment and a positioning error. FIG. 3A shows experimental results in the multipath environment, and FIG. 3B shows experimental results in the open-sky environment. FIGS. 3A and 3B show experimental results for a plurality of satellite sets at the same time in the respective reception environments provided that the present position of the portable telephone 1 is known.

FIG. 3A shows a horizontal error and an altitude error of each of sixteen satellite sets including five or more GPS satellites among seven GPS satellites (#1 to #7) acquired in the multipath environment, and a positioning altitude difference which is the difference between the maximum value and the minimum value of the altitude errors of all the satellite sets. The term "horizontal error" refers to the horizontal difference between the present position of the portable telephone 1 calculated based on the GPS satellites of the target satellite set and the known position of the portable telephone 1. The term "altitude error" refers to the vertical difference between the present position of the portable telephone 1 calculated based on the GPS satellites of the target satellite set and the known position of the portable telephone 1.

FIG. 3B shows the horizontal error and the altitude error of each of twenty two satellite sets including three or more GPS satellites among six GPS satellites (#3, #4, and #8 to #11) acquired in the open-sky environment.

When comparing the reception environments shown in FIGS. 3A and 3B, the horizontal error and the altitude error are larger in the multipath environment as compared with the open-sky environment. The horizontal error and the altitude error differ between the multipath environment and the open-sky environment by two figures. Specifically, positioning accuracy is lower in the multipath environment than in the open-sky environment. Therefore, the change amount $\Delta E$ is subtracted in the multipath environment from the evaluation point E of each satellite set calculated in the same manner as in the open-sky environment.

As shown in FIG. 3A, the horizontal error and the altitude error of each satellite set vary to a large extent in the multipath environment. The positioning altitude difference which indicates the degree of variation in altitude error is about 800 m in the multipath environment. In the multipath environment, a signal affected by a multipath is included in the acquired GPS satellite signals. Since each GPS satellite signal is affected by a multipath to a different extent, positioning accuracy varies between the satellite sets.

As shown in FIG. 3B, the horizontal error and the altitude error of each satellite set vary to a small extent in the open-sky environment. The positioning altitude difference in the open-sky environment is about 2 m. In the open-sky environment, since the acquired GPS satellite signals are not affected by a multipath or the like, positioning accuracy varies to only a small extent between the satellite sets.

In this embodiment, the reception environment is determined based on the variation in altitude error. Specifically, the reception environment is determined to be the multipath environment when the positioning altitude difference exceeds a given threshold value, and is determined to be the open-sky environment when the positioning altitude difference is equal to or less than the given threshold value.

In the multipath environment, positioning accuracy differs to a large extent between the satellite sets due to a large variation in altitude error, as described above. In this embodiment, the change amount $\Delta E$ of each satellite set is determined corresponding to the positioning accuracy of that satellite set. The positioning accuracy of each satellite set is determined based on the altitude difference $\Delta Z$ which is the difference between the altitude (present altitude) of the candidate present position of that satellite set and the altitude (preceding altitude) of the preceding located position. Specifically, the positioning error is determined to be larger as the altitude difference $\Delta Z$ increases, and is determined to be smaller as the altitude difference $\Delta Z$ decreases. The change amount $\Delta E$ of a satellite set with lower positioning accuracy is increased to decrease the evaluation point E of that satellite set. Therefore, the change amount calculation equation f for calculating the change amount $\Delta Z$ is defined so that the change amount $\Delta E$ increases as the altitude difference $\Delta Z$ increases, as shown in FIG. 2.

In this embodiment, the altitude corresponding to the latitude and the longitude of the preceding located position is acquired referring to the predetermined altitude table, and the acquired altitude is determined to be the preceding altitude as the reference altitude. Note that the altitude of the preceding located position may be determined to be the preceding altitude without referring to the altitude table. However, since the located position is not an accurate value, the accuracy of determining positioning accuracy may deteriorate as compared with the case of using the altitude table.

Moreover, the positioning error of each satellite set differs to a large extent even in the multipath environment. This is because whether or not the reception environment is the multipath environment is determined based on whether or not the positioning altitude difference exceeds the given threshold value. Specifically, the positioning accuracy may be lower when the positioning altitude difference exceeds the threshold value to only a small extent than that when the positioning altitude difference exceeds the threshold value to a large extent in the multipath environment Therefore, two calculation equations f1 and f2 corresponding to the positioning altitude difference are defined as the change amount calculation equation f, as shown in FIG. 2, and the calculation equation used as the change amount calculation equation f is selected corresponding to the positioning altitude difference.

When the evaluation points E of all satellite sets have been calculated using the evaluation method corresponding to the reception environment, a satellite set having the highest evaluation point E is selected from among these satellite sets, and the candidate present position P corresponding to the selected satellite set is determined to be the present located position.

Figures 4, 5, 6:
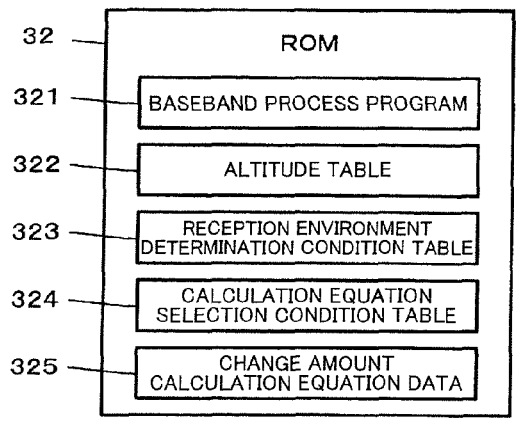
FIG. 4 is a configuration diagram of a ROM.
FIG. 5 shows a data configuration example of an altitude table.
FIG. 6 shows a data configuration example of a reception environment determination condition table.

Again referring to FIG. 1, the ROM 32 stores a system program which causes the CPU 31 to control each section of the baseband process circuit section 30 and the RF receiver circuit section 21, and a program and data necessary for the CPU 31 to implement various processes including the baseband process. FIG. 4 is a view showing the configuration of the ROM 32. As shown in FIG. 4, the ROM 32 stores a baseband process program 321, an altitude table 322, a reception environment determination condition table 323, a calculation equation selection condition table 324, and a change amount calculation equation data 325.

The altitude table 322 is a data table which defines an altitude corresponding to each area (divided area) into which the earth's surface is divided in the shape of a mesh. FIG. 5 shows an example of the data configuration of the altitude table 322. As shown in FIG. 5, the altitude table 322 stores an area ID 322a (i.e., identification number of a divided area), a center position 322b, and an altitude 322c corresponding to each divided area. The latitude and the longitude are stored as the center position 322b. Each divided area has a square shape and is defined so that each side of the square extends along the latitude direction or the longitude direction.

The reception environment determination condition table 323 is a data table which defines a reception environment determination condition. FIG. 6 shows an example of the data configuration of the reception environment determination condition table 323. As shown in FIG. 6, the reception environment determination condition table 323 stores a determination condition 323a corresponding to each reception environment 323a. A positioning altitude difference condition is stored as the determination condition 323b.

Figures 7, 8, 9:
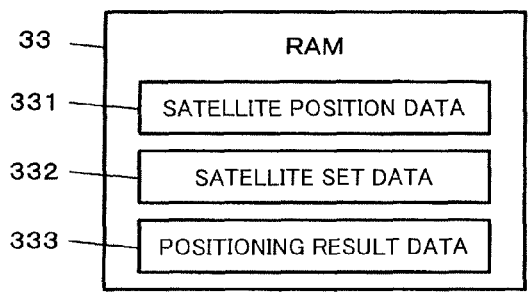
FIG. 7 shows a data configuration example of a calculation equation selection condition table.
FIG. 8 is a configuration diagram of a RAM.
FIG. 9 shows a data configuration example of satellite position data.

The calculation equation selection condition table 324 is a data table which defines a selection condition for the change amount calculation equation f. FIG. 7 shows an example of the data configuration of the calculation equation selection condition table 324. As shown in FIG. 7, the calculation equation selection condition table 324 stores a selection condition 324b corresponding to each change amount calculation equation 324a. A positioning altitude difference condition is stored as the selection condition 324b.

The change amount calculation equation data 325 is data which defines the change amount calculation equation f. For example, functional equations of the graphs of the change amount calculation equations f1 and f2 shown in FIG. 2 are stored as the change amount calculation equation data 325.

The RAM 33 is used as a work area for the CPU 31, and temporarily stores a program and data read from the ROM 32, results of calculations performed by the CPU 31 based on various programs, and the like. FIG. 8 shows an example of the configuration of the RAM 33. As shown in FIG. 8, the RAM 33 stores satellite position data 331, satellite set data 332, and positioning result data 333.

The satellite set data 331 is data relating to the position of a GPS satellite acquired by each positioning process. FIG. 9 shows an example of the data configuration of the satellite position data 331. As shown in FIG. 9, a satellite position 331b calculated based on the GPS satellite signal is stored as the satellite position data 331 corresponding to each GPS satellite 331a acquired.

The satellite set data 332 is data relating to the satellite set selected by each positioning process. FIG. 10 shows an example of the data configuration of the satellite set data 332. As shown in FIG. 10, a GPS satellite 332b included in the satellite set, a calculated candidate present position 332c, a number of satellites 332d, a PDOP value 332e, and an evaluation point 332f are stored as the satellite set data 332 corresponding to each selected satellite set 332a.

The positioning result data 333 is data relating to calculation results of each positioning process. FIG. 11 shows an example of the data configuration of the positioning result data 333. As shown in FIG. 11, a positioning time 333a, a selected satellite set 333b, and a located position 333c are stored as the positioning result data 333 corresponding to each positioning process from the start of positioning Again referring to FIG. 1, the host CPU 40 controls each section of the portable telephone 1 based on various programs such as the system program stored in the ROM 43. Specifically, the host CPU 40 mainly implements a telephone call function, and performs a process for implementing various functions including a navigation function such as causing the display section 42 to display a navigation screen in which the present position of the portable telephone 1 input from the baseband process circuit section 30 is plotted on a map.

The operation section 41 is an input device including an operation key, a button switch, and the like. The operation section 41 outputs an operation signal corresponding to the operation of the user to the host CPU 40. Various instructions such as a positioning start/finish instruction are input by operating the operation section 41. The display section 42 is a display device such as a liquid crystal display (LCD). The display section 42 displays a display screen (e.g., navigation screen and time information) based on a display signal input from the host CPU 40.

The ROM 43 stores a system program which causes the host CPU 40 to control the portable telephone 1, a program and data necessary for implementing a navigation function, and the like. The RAM 44 is used as a work area for the host CPU 40. The RAM 44 temporarily stores a program and data read from the ROM 43, data input from the operation section 41, results of calculations performed by the host CPU 40 based on various programs, and the like.

The portable telephone antenna 50 is an antenna which transmits and receives a portable telephone radio signal between the portable telephone 1 and a radio base station installed by a communication service provider of the portable telephone 1. The portable telephone wireless communication circuit section 60 is a portable telephone communication circuit section which includes an RF conversion circuit, a baseband process circuit, and the like, and transmits and receives a radio signal under control of the host CPU 40.

Process Flow

Figure 12:
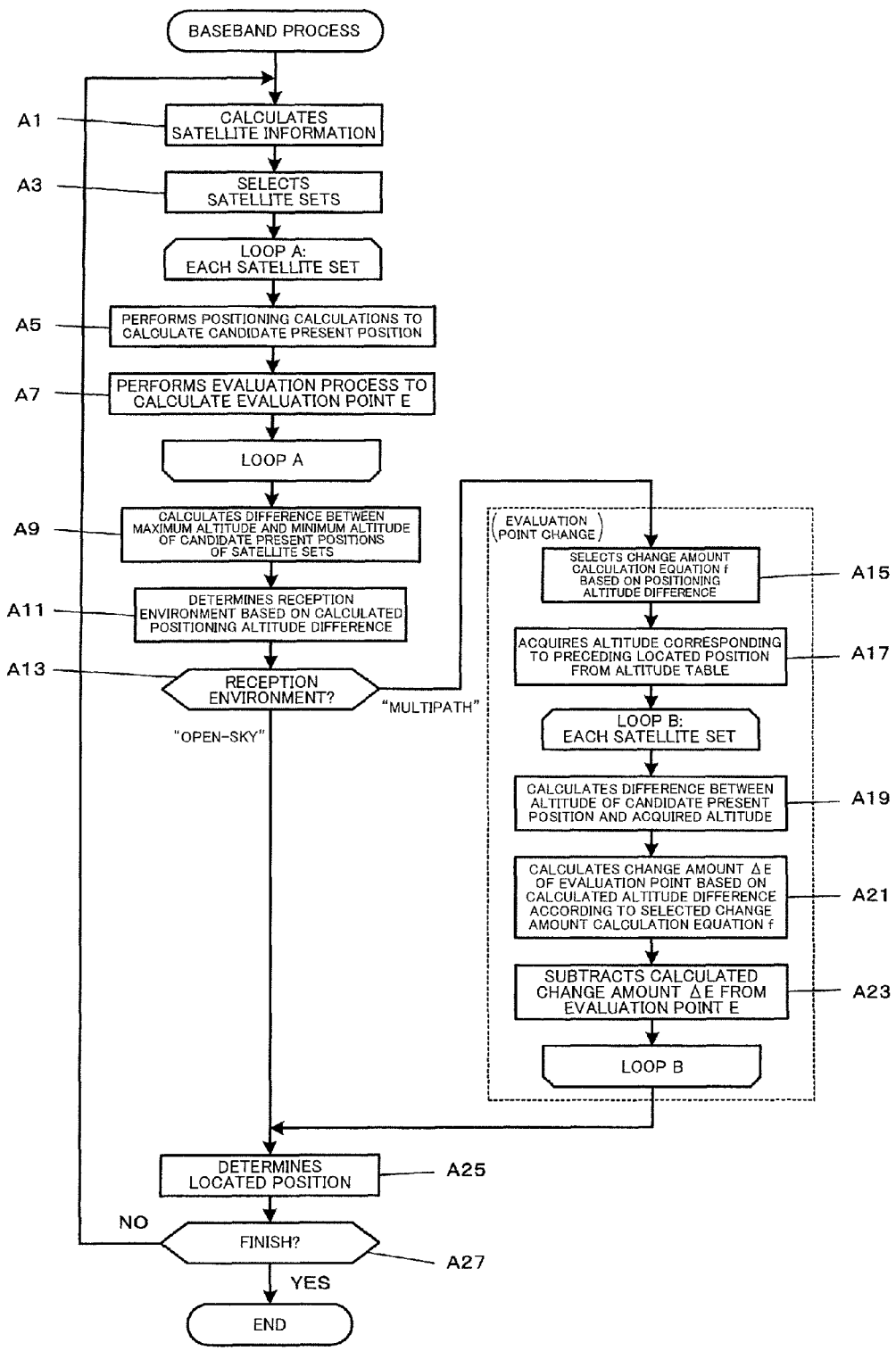
FIG. 12 is a flowchart of a baseband process.

FIG. 12 is a flowchart illustrative of the flow of the baseband process. The baseband process is implemented by causing the CPU 31 to execute the baseband process program 321. A digital IF signal obtained by down-converting an RF signal received by the GPS antenna 10 into an IF signal by the RF receiver circuit section 21 is input to the baseband process circuit section 30 before the baseband process.

As shown in FIG. 12, the CPU 31 calculates satellite information (including the position) relating to each GPS satellite based on the acquired GPS satellite signal (step A1). The CPU 31 selects satellite sets made up of four or more GPS satellites based on the acquired satellite signals (step A3), and performs a loop A process on each selected satellite set.

In the loop A, the CPU 31 calculates the pseudo-range between the portable telephone 1 and each GPS satellite included in the target satellite set based on the position of each GPS satellite, for example, and calculates the candidate present position P by performing positioning calculations using a least-square method (step A5). The CPU 31 then performs an evaluation process using the number of satellites and the PDOP value of the target satellite set and the like to calculate the evaluation point E for the candidate present position P corresponding to the target satellite set (step A7). The loop A is thus performed.

When the CPU 31 has performed the loop A process on all satellite sets, the CPU 31 extracts the maximum value (maximum altitude) and the minimum value (minimum altitude) of the altitudes of the calculated candidate present positions P corresponding to the satellite sets, and calculates the positioning altitude difference (i.e., difference between the maximum value (maximum altitude) and the minimum value (minimum altitude)) (step A9). The CPU 31 determines the reception environment based on the calculated positioning altitude difference using the reception environment determination condition table 324 (step A11).

When the CPU 31 has determined that the reception environment is the multipath environment (step A13: "Multipath"), the CPU 31 performs an evaluation point change process. Specifically, the CPU 31 selects the change amount calculation equation f based on the calculated positioning altitude difference using the calculation equation selection condition table 324 (step A15). The CPU 31 acquires the altitude (preceding altitude) corresponding to the preceding located position referring to the altitude table 322 (step A17).

The CPU 31 then performs a loop B process on each satellite set. In the loop B, the CPU 31 calculates the altitude difference $\Delta Z$ which is the difference between the altitude of the candidate present position P corresponding to the target satellite set and the acquired preceding altitude (step A19). The CPU 31 changes the change amount $\Delta E$ based on the calculated altitude difference $\Delta Z$ according to the selected change amount calculation equation f (step A21). The CPU 31 subtracts the calculated change amount $\Delta E$ from the evaluation point E of the target satellite set (step A23). The loop B is thus performed. The evaluation point change process is thus completed.

The CPU 31 then selects a satellite set with the highest evaluation point E from the satellite sets, and determines the candidate present position P corresponding to the selected satellite set to be the present located position of the portable telephone 1 (step A25). The CPU 31 then determines whether or not to finish positioning. When the CPU 31 has determined to continue positioning (step A27: NO), the CPU 31 returns to the step A1 and performs the next positioning. When the CPU 31 has determined to finish positioning (step A27: YES), the CPU 31 finishes the baseband process.

Modification

Embodiments to which the invention may be applied are not limited to the above-described embodiments. Various modifications and variations may be made without departing from the spirit and scope of the invention.

(A) Determination of Reception Environment

In the above embodiments, the reception environment is determined based on the positioning altitude difference (i.e., difference between the maximum value (maximum altitude) and the minimum value (minimum altitude) of the altitude) as a dispersion which indicates an index that indicates the degree of distribution (variation) of the altitudes of the present positions P corresponding to the satellite sets. Note that the reception environment may be determined based on another dispersion such as a variance or a standard deviation.

(B) Reception Environment

In the above embodiments, the reception environment is classified as the multipath environment and the open-sky environment. Note that the reception environment may be classified as three or more environments including an indoor environment, for example. In this case, the determination condition is appropriately set for each reception environment.

(C) Change Amount Calculation Equation f

In the above embodiments, the calculation equation f1 or f2 is used as the change amount calculation equation f. Note that three or more calculation equations f1, f2, f3, . . . may be used. In this case, the selection condition is appropriately set for each calculation equation.

(D) Host CPU

Some or all of the processes performed by the CPU 31 of the baseband process circuit section 30 may be performed by the host CPU 40 by means of software.

(E) Positioning Device

The above embodiments have been described taking an example of a portable telephone which is an electronic instrument including a positioning device. Note that the invention may also be applied to other electronic instruments such as a portable navigation system, a car navigation system, a personal digital assistant (PDA), and a wristwatch.

(F) Satellite Positioning System

The above embodiments have been described taking an example utilizing the GPS. Note that the invention may also be applied to other satellite positioning systems such as the global navigation satellite system (GLONASS).

(G) Storage Medium

A configuration may be employed in which the baseband process program 321 is recorded on a recording medium such as a CD-ROM and installed in an electronic instrument such as a portable telephone.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning method comprising:

receiving positioning signals from positioning satellites;

generating a first and second satellite sets;

obtaining a first position using the first satellite set and a second position using the second satellite set, the first position including a first altitude, the second position including a second altitude;

determining a reception environment based on a difference between the first and second altitudes;

evaluating the first and second positions using an evaluation method according to the reception environment; and selecting one of the positions based on a result of the evaluation as a position fix.

2. The positioning method according to claim 1, wherein the determining the reception environment includes calculating a difference between a maximum altitude and a minimum altitude.

3. The positioning method according to claim 1, wherein the determining the reception environment includes selecting a reception environment from a plurality of determined reception environments, and if the reception environment is determined to be a multipath environment, the evaluating the first and second positions includes giving a higher evaluation value to the result of the evaluation based on a difference between an altitude of the position fix and a reference altitude.

4. The positioning method according to claim 1, wherein the determining the reception environment includes selecting a reception environment from a plurality of determined reception environments, and if the reception environment is not determined to be a multipath environment, the evaluating the first and second positions includes giving a lower evaluation value to the result of the evaluation based on a difference between an altitude of the position fix and a reference altitude.

5. The positioning method according to claim 3, wherein the reference altitude is an altitude of a position fix from a previous iteration in a positioning calculation.

* * * * *